United States Patent

Smith et al.

[11] 4,059,161
[45] Nov. 22, 1977

[54] TILLAGE APPARATUS AND IMPROVED BLADE THEREFOR

[75] Inventors: Edward M. Smith; James H. Casada; Timothy H. Taylor, all of Lexington, Ky.

[73] Assignee: Deere & Company, Moline, Ill.

[21] Appl. No.: 607,801

[22] Filed: Aug. 26, 1975

Related U.S. Application Data

[63] Continuation of Ser. No. 427,912, Dec. 26, 1973, abandoned.

[51] Int. Cl.² ............................................. A01B 35/16
[52] U.S. Cl. ..................................... 172/60; 172/747; 172/117; 172/120; 172/531; 172/540; 172/555; 172/604; 172/745
[58] Field of Search .................... 172/60, 57, 120, 117, 172/555, 531, 540, 556, 604, 745, 747; 111/87; 83/835

[56] References Cited

U.S. PATENT DOCUMENTS

| 824,014 | 6/1906 | Hayward | 172/60 |
| 830,126 | 9/1906 | Wilder | 172/540 |
| 994,707 | 6/1911 | Meissner | 172/120 X |
| 2,271,032 | 1/1942 | Pettman | 172/556 |
| 2,637,154 | 5/1953 | Shaver | 172/117 X |
| 2,691,933 | 10/1954 | Emerson | 172/555 X |
| 3,175,522 | 3/1965 | Garber et al. | 172/556 X |
| 3,202,221 | 8/1965 | Monk et al. | 172/60 X |
| 3,496,973 | 2/1970 | Ballard | 83/835 |

FOREIGN PATENT DOCUMENTS

| 218,286 | 4/1961 | Austria | 172/120 |

Primary Examiner—Paul E. Shapiro
Attorney, Agent, or Firm—David H. Hill

[57] ABSTRACT

A tillage apparatus for sod seeding usage includes a plurality of tillage unit assemblies having power driven blades receiving power from a tractor which tows the apparatus. An improved tillage blade is disclosed.

9 Claims, 6 Drawing Figures

TILLAGE APPARATUS AND IMPROVED BLADE THEREFOR

This is a continuation of application Ser. No. 427,912, filed Dec. 26, 1973, now abandoned.

BACKGROUND OF THE INVENTION

Recent developments in the practice of growing legumes in an established grass sod have disclosed the inadequacies of conventional tillage apparatus, such as disk harrows, disk cultivators, rotary hoes or the like, for preparing the ground for seeding. Often the particular ground surface, in contrast with ground used for grain crops, will be uneven or rocky or with grass swards of differing thicknesses. In the preparation of such ground in sod-seeding or grassland renovation it is desirable to reduce the number of trips required over the same ground surface in order to complete the sequence of tilling, seeding, cultipacking and spraying of herbicide, and thus a premium is placed upon the efficiency of the initial tilling action. If this, for example, can be accomplished properly by means of a tilling structure drawn by a single prime mover, then equipment for carrying out the subsequent steps may be added to the same structure and the entire sod seeding procedure may be conducted during one passage over the field.

Cutting of the sward and sod matt and provision of a furrow therein of appropriate width and depth requires not only a tillage blade of special design, but also a source of power of appreciable magnitude for driving of the blade. While this power could be provided by an engine mounted on a towed vehicle, the present invention preferably employs the engine of a tractor, as for example taught by the patent to Kaller U.S. Pat. No. 2,957,529, and the tillage apparatus may be disconnected from the tractor in order to release the tractor for other uses. As will later appear, a plurality of tillage unit assemblies each having at least one blade and rotating at speeds of from 500 to 1,200 rpm have been found to be appropriate to till the sod, requiring substantially more power supplied from the tractor than required when tilling with a conventional rotary hoe or disk harrow.

SUMMARY

The apparatus comprises a structure detachably connected to a conventional tractor which tows the same and which supplies power to a plurality of tillage blades mounted upon separate tillage unit assemblies suspended from a tool bar. Each of the tillage unit assemblies is independently biased to bring the blades into proper cutting relation to the ground and with a restraint against cutting too deeply into the ground. The blade is provided with wear-resisting elements having improved wear surfaces to extend its useful life and to provide a uniform width of furrow.

Among the objects of the invention are the provision of a driven-blade tillage apparatus suitable for attachment to a tractor having a three point hitch and a power take-off shaft; the provision of a tillage apparatus having a plurality of tillage unit assemblies mounted side by side on a tool bar supported drive shaft and independently biased to bring their tillage blades into contact with the ground; the provision of a tillage unit assembly having an arm pivotally mounted on a drive shaft and carrying a furrow-producing driven blade at its other end; the provision of a tillage unit assembly which can be readily installed upon or removed from a drive shaft; and the provision of an improved tillage blade having spaced wear resisting elements at its periphery.

These and other objects and advantages of the invention will become more apparent as the description proceeds and when considered in conjunction with the accompanying drawings in which.

Figure 1:
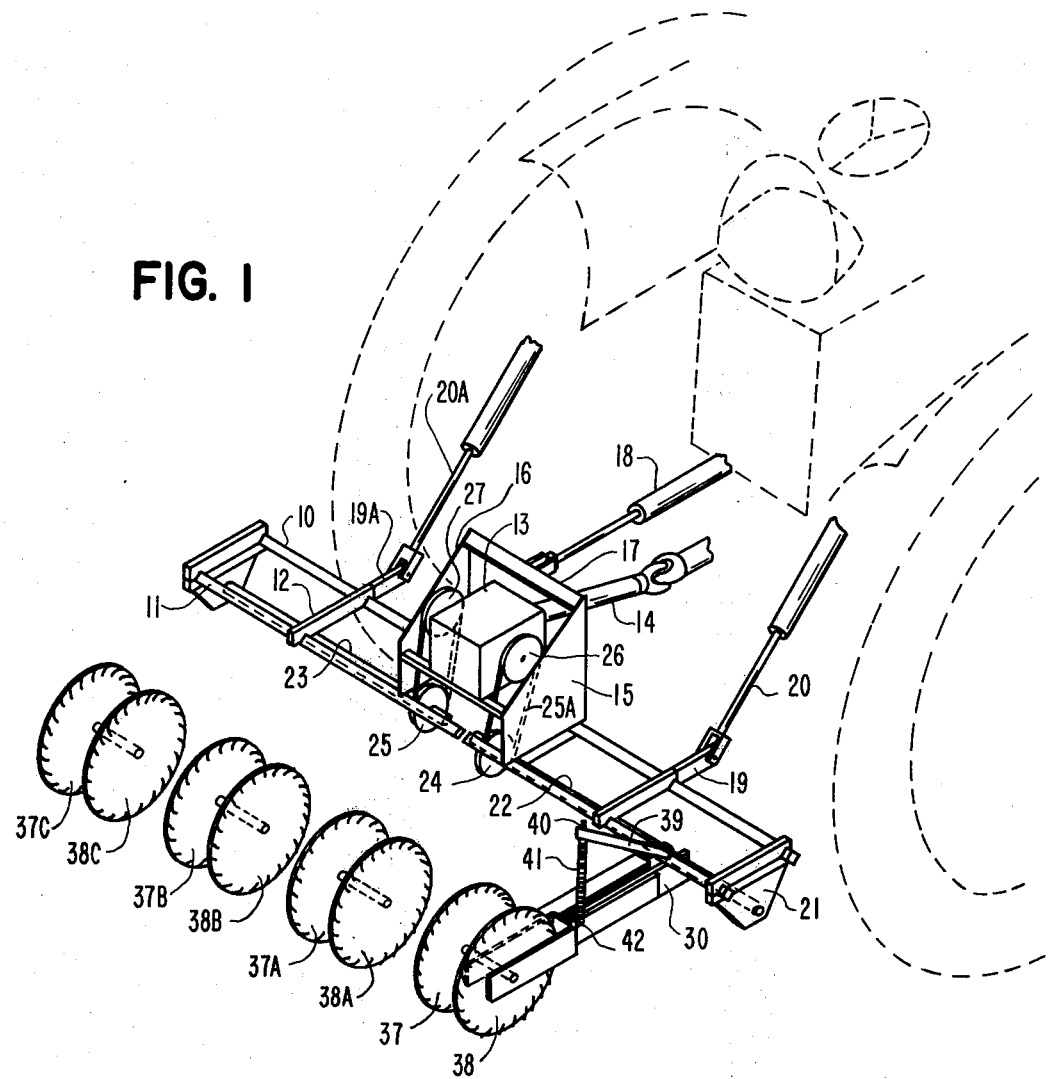
FIG. 1 is a perspective view of the tillage apparatus connected to a tractor and showing a single tillage unit assembly in operative position and with companion units indicated by separate blade pairs.

Referring now to FIG. 1, a suitable tool bar having elongated members 10, 11 with cross braces 12 attached thereto serves as a platform for mounting of a gear box 13. A shaft extending from the gear box is attached by means of a universal joint to a suitable link 14 having a universal joint at its other end detachably connected to the shaft of a conventional power take-off of the tractor. A pair of spaced uprights 15,16 affixed to the platform on each side of the gear box are joined at the upper ends by a rod 17 to which a link 18 is pivotally conected, with the other end of this link being pivotally attached to the upper hitch point of the tractor. A forwardly projecting plate 19 attached to the tool bar platform has a lift rod 20 pivotally attached thereto for detachable connection with one of the lower hitch points of the tractor, a similar arrangement, 19A,20A, being employed for the other lower hitch point thereof. As a consequence, the operator from his position on the seat of the tractor may lift the tillage apparatus from the ground even when the blades are fully biased toward the ground, as later to be described.

Rigidly secured to the underside of the tool bar members is a series of longitudinally spaced pillow blocks, one of which is shown at 21, and within which series of pillow blocks a single long shaft, or preferably a pair of shorter shafts 22,23 is journalled for rotation. Affixed to these shafts is a pair of sprockets 24,25 driven, as for example, by chains from corresponding sprockets mounted on the opposite ends of a power output shaft in the gear box, one such chain 25A and gear box sprocket 26 being shown in FIG. 1.

Figure 2:
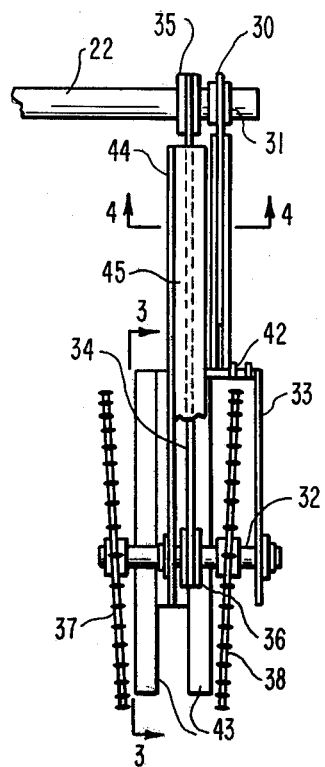
FIG. 2 is a plan view to a larger scale of a tillage unit assembly mounted on the drive shaft and with parts broken away.
Figure 4:
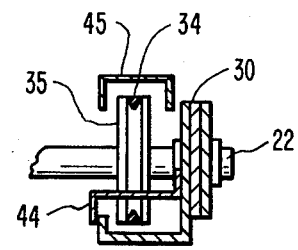
FIG. 4 is a sectional view taken on line 4—4 of FIG. 2.
Figure 3:
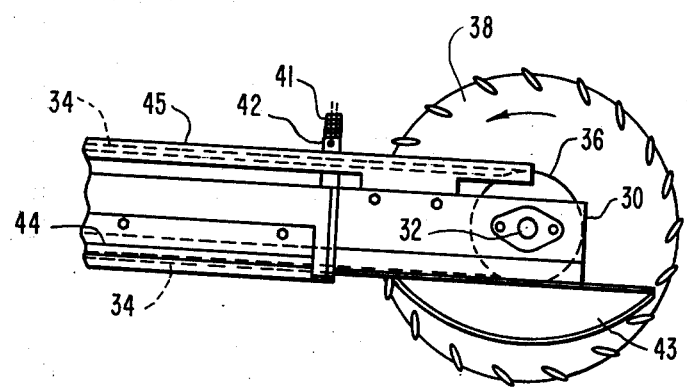
FIG. 3 is a side elevation view of a tillage unit assembly with one blade removed and showing a furrow-depth-limiting skid.

Considering now FIGS. 2 to 4, a tillage unit assembly of the present invention comprises a sturdy arm 30, for example about 2 feet in length, and which is pivotally mounted at one end upon a suitable bearing 31 affixed to shaft 22 after having been slipped therealong to the desired location. At its distal end the arm supports a rotatable short shaft 32 which likewise is supported by a lateral portion 33 of the arm. A suitable driving means is provided for causing the short shaft to rotate as the shaft 22 is driven, and this may comprise a series of gears, a sprocket driven chain, or, as shown, a belt 34 driven by a pulley 35 keyed to shaft 22 and engaging with a pulley 36 keyed to shaft 32. Any conventional means for taking up slack in the belt may be used.

As a significant feature of the invention, one or more tillage blades are suitably fastened to the short shaft, a pair of similar blades 37,38 being preferred although a third blade could be employed with an extended short shaft outboard of the lateral arm 33 if so desired. In general, the lateral distance between furrows made in the sod is to be uniform, and since a plurality of the described tillage unit assemblies are to be mounted on the shafts 22,23, the distance between adjacent unit assemblies on those shafts will correspond to the distance between the blades on any given unit assembly. To avoid the necessity of lifting and lowering all blades of the apparatus when obstructions such as rocks are encountered or when non-uniform ground surface is being tilled, each of the present tillage unit assemblies is independently biased downwardly to supplement the bias of gravity on the pivoted arms. For this purpose a rearwardly extending upright 39 is affixed to the tool bar platform and mounts a spring adjusting means 40 providing an adjustable abutment against which one end of a compression spring 41 bears. The other end of the spring bears upon a boss 42 provided near the junction of arm 30 and its lateral arm 33. A suitable means for limiting the depth of penetration of the blade also is employed, and as seen in FIG. 3 this may comprise a skid portion 43 depending from the arm 30 and riding on the ground as the blades are biting into the ground. This skid portion also may provide a support (not shown) for a seed feeding apparatus carried by the tool bar, if so desired. As will be evident, the tillage unit assembly when operating near the sod is subject to accumulation of grass particles as well as particles of soil thrown forward by the rotating blade, and a shield is normally carried by the arm 30, one such shield as shown in FIGS. 3 and 4 comprising a combined lower and side wall 44 and a removable upper wall 45 serving to shield the described pulleys and belt.

Each of the tillage unit assemblies described comprises a standard assembly which can be readily mounted upon or removed from the drive shaft. For example, if the particular sod field being tilled is such as to require an amount of power which the tractor is unable to deliver to shafts 22,23 the operator can remove one or both of the outermost assemblies from those shafts. Normally, an equal number of assemblies are mounted on shafts 22,23 as indicated by blades 37 to 37C and 38 to 38C.

Figure 5:
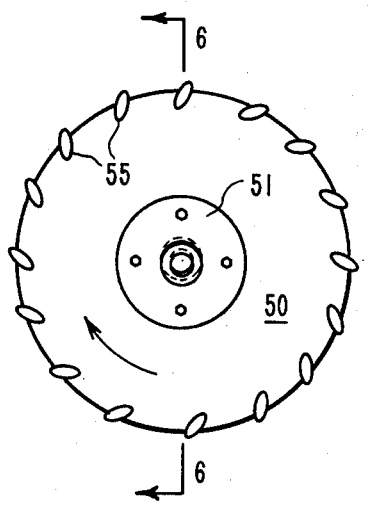
FIG. 5 is a side elevation view of a tillage blade.
Figure 6:
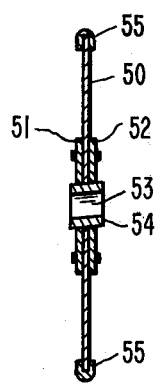
FIG. 6 is a sectional view taken on line 6—6 of FIG. 5.

Referring now to FIGS. 5 and 6 the tillage blade, which for example may be about 12 inches in diameter, comprises a central body portion 50 preferably of mild steel with a reinforced hub section conveniently formed by a pair of plates 51,52 rigidly attached thereto. Extending through these plates and the confined central disc is a bore 53 having an axis displaced a suitable amount from the plane of the blade so as to effect the well known wobble action of the blade during its passage along the ground. The interior of the bore also is provided with a key slot 54 for affixing the blade to a keyed portion of the short shaft 32. Experience has shown that a conventional disc blade, whether with a smooth circular periphery or a serrated periphery will suffer unacceptable wear when driven at the necessary speeds to carry out the sod seeding process in the swards of the average grasslands. To overcome this handicap the blade of the present tillage unit is provided with special wear resisting elements comprising short lengths of rod-like material 55 welded to each side of the blade adjacent its periphery and extending in an unbroken length transversely over that periphery. A tungsten carbide material, such as Stellite is satisfactory for this purpose. Preferably, these elements extend along the sides of the blade in a trailing direction as related to the rotation of the blade.

As will be understood, the ratios of the pulleys 35,36; the sprockets 24,26; and the gears within gear box 13 together with the rated speed of the power take off of the tractor are chosen so as to provide the appropriate angular velocity of the blade for its intended purposes. If it is desired to rotate the blade at a different speed, this may be accomplished simply by substitution of a different pulley 36. As seen in FIG. 3, removal of blade 37 permits access to pulley 36 for such purposes.

As the blade revolves with its wobble motion, the wear elements cut a furrow whose depth is commensurate with the restraint provided by the skid 43 and a width commensurate with the canted axis of the blade on shaft 32. During this furrow cutting a major portion of the displaced earth is being thrown rearwardly, and the rate of furrowing is dependent upon the rate of travel of the tractor. The size and strength of the described tool bar platform, moreover, is such as to support axiliary equipment such as seeding and spraying equipment and to act as a towing means for an axiliary soil-firming device passing over the seeded furrow.

While the spacing between furrows is dependent upon the spacing between blades on each tillage unit assembly and upon the spacing between adjacent units, it will be understood that the invention is not limited to a single transverse array of tillage units. For example, the gear box 13 may supply power to a plurality of transverse shafts each of which has tillage unit assemblies pivoted thereon and arranged to cut a pattern of furrows more closely spaced than those cut with a single array of blades.

While the described apparatus is especially useful for grassland renovation purposes, it is by no means limited solely thereto, and may be employed in other agricultural usages.

Having thus described a preferred form of tillage apparatus and blade therefor, it will be understood that the invention may be embodied in forms other than the exemplified as the preferred form.

What is claimed is:

1. A tillage apparatus for use with a towing vehicle for cutting a plurality of continuous narrow spaced furrows, comprising an elongated transverse tool bar supporting a transverse drive shaft, said tool bar being attachable to said vehicle and supporting a power means connected to said drive shaft, a plurality of tillage unit assemblies detachably mounted side by side on said drive shaft, each of said assemblies comprising an arm pivotally journalled at one end upon said transverse drive shaft and carrying a rotatable short transverse shaft at its other end, at least one tillage blade affixed to said short transverse shaft and rotatable therewith, each said tillage blade constituting a generally planar disc-like plate in substantial alignment with the direction of towing and having a generally circular cutting periphery with a plurality of substantially U-shaped circumferentially-spaced furrow-opening wear-resisting metallic elements astraddle said periphery, the two leg portions of each of said U-shaped elements being permanently affixed to respective sides of said blade adjacent its periphery, with the bight portion of each of said U-shaped elements extending transversely over said periphery, means biasing said arm downwardly to bring said blade into cutting contact with the ground and independently of the biasing of adjacent assemblies, and blade driving means interconnecting said drive shaft and said short shaft and providing for rotation of said blade upon actuation of said power means, whereby each said tillage blade cuts a continuous discreet narrow furrow as the apparatus is towed over the ground.

2. Apparatus as defined in claim 1, wherein said power means comprises a gear arrangement receiving power from the towing vehicle and transmitting power to said drive shaft.

3. Apparatus as defined in claim 1 wherein said biasing means comprises an adjustable compression spring interposed between said arm and an abutment supported by said tool bar.

4. Apparatus as defined in claim 1 including means disposed at said other end of said arm and adpated to contact the ground thereby to limit penetration of said blade into the ground.

5. Apparatus as defined in claim 1 including means supported by said arm and shielding said blade driving means from material thrown forwardly by the blade while rotating.

6. Apparatus as defined in claim 1 wherein said blade is mounted upon said short shaft in a plane other than normal to the axis of said short shaft.

7. The tillage apparatus of claim 1 wherein said apparatus includes a pair of said tillage blades affixed to said short transverse shaft at opposite sides of said arm pivotally journalled on said drive shaft.

8. A tillage apparatus, comprising: frame means;
mounting means having a first portion connected with said frame means and a second portion spaced from said first portions; and
tillage blade means mounted on said second portion of said mounting means, said tillage blade means including a disc-like body portion and having a ground engaging portion to form a furrow of predetermined narrow width when said tillage apparatus is moved in a predetermined normal operating direction, said ground engaging portion including a plurality of substantially U-shaped circumferentially-spaced cutting elements astraddle said ground engaging portion, the two leg portions of each of said U-shaped elements being permanently affixed to respective sides of said blade means adjacent its ground engaging portion, with the bight portion of each of said U-shaped elements extending transversely over said ground engaging portion.

9. The tillage apparatus of claim 8 wherein each of said plurality of protruding circumferentially spaced furrow-opening cutting elements of said tillage blade includes wear resisting material contacting the ground to form said furrow therein.

* * * * *